Aug. 15, 1961  G. LUGLI  2,996,097
BELTING STRUCTURE OF PNEUMATIC TIRES
Filed Oct. 23, 1957  2 Sheets-Sheet 1

INVENTOR
*Giuseppe Lugli*

BY *Stevens, Davis, Miller & Mosher*
ATTORNEYS

Aug. 15, 1961 G. LUGLI 2,996,097
BELTING STRUCTURE OF PNEUMATIC TIRES
Filed Oct. 23, 1957 2 Sheets-Sheet 2

INVENTOR
*Giuseppe Lugli*

BY *Stevens, Davis, Miller & Mosher*
ATTORNEYS

United States Patent Office 2,996,097
Patented Aug. 15, 1961

2,996,097
BELTING STRUCTURE OF PNEUMATIC TIRES
Giuseppe Lugli, Milan, Italy, assignor to
Pirelli S.p.A., Milan, Italy
Filed Oct. 23, 1957, Ser. No. 691,901
Claims priority, application Italy Dec. 22, 1956
14 Claims. (Cl. 152—361)

The present invention relates to pneumatic tires of the type having an internal belting structure, and, in particular, to improvements in the form of the belting structure itself.

Pneumatic tires are already known wherein said tires are provided with an internal belting structure capable of withstanding the tension stresses when placed under tension by inflation pressure. This belting structure, which is ring-shaped and composed of strips extending along the whole periphery of the tire below the tread area, is applied to a special carcass so constructed as to be incapable of hindering the otherwise free movements of the belting structure when the tire is squeezed against the ground under the wheel load. Such pneumatic tires are disclosed and illustrated in Italian Patents Nos. 479,133, 513,409 and 529,370.

In the above tires, the belting structure is generally composed of strips situated in the area below the tread and having a reduced width, which usually corresponds to the width of the tread itself. The strips are constituted of cords made of a substantially inextensible material which may be natural, artificial or synthetic textile material or metallic material. The cords are disposed parallel to one another in each layer and are rubberized with a natural and/or synthetic rubber based compound. These strips, which constitute the belting structure, may be disposed with the cords in longitudinal direction, namely parallel to the mid-circumferential plane of the tire, or crossed to one another so as to form symmetrical angles with respect to this plane.

Several modifications of the belting structure have been devised and patented by the applicant; particular mention is made of the Italian Patents Nos. 546,017, 549,017, 549,018 and 550,080 relating to belting structures in which the cords are disposed at an angle with respect to the mid-circumferential plane of the tire. The modifications described in the first three patents relate to an articulated belting structure, which will be called "hinged structure," which comprises a central portion where the cords are longitudinally disposed and two lateral portions composed of cords symmetrically inclined with respect to the mid-circumferential plane of the tire. In one particular embodiment each lateral portion may be composed of one or more strips so folded that their folding lines will be adjacent to the central portion. According to the Italian Patent No. 550,080, belting structures have been similarly obtained, which are formed of layers folded on themselves along two folding lines, parallel to one another and to the mid-circumferential plane. The layer folds are superposed and the folding lines are situated laterally, near the tread edges.

The above indicated belting structures, as well as others which have not been referred to herein, were designed to solve particular problems, including the type of material employed and/or the cord disposition. In practice, however, it has been ascertained that all of these embodiments, although they comply with the particular requirements for which they have been devised, show some disadvantages.

For example, those embodiments in which the folding lines are situated laterally near the tread edges may advantageously be adopted in the case of textile materials, but prove unsuccessful when a material of greater rigidity is used, as for instance, a metal, in which case there is an impairing effect on the adaptability of the tread to the ground.

Also, the above mentioned "hinged structures," even allowing a better adaptability of the tread to the ground when the tire is running round a curve or on a rough road, show, in the transverse direction, a variation in the characteristics of longitudinal resistance from the longitudinal central portion to the lateral portions.

The present invention relates to pneumatic tires provided with a belting structure, and more precisely it pertains to a belting structure in which the cords are inclined with respect to the mid-circumferential plane.

Therefore, the principal object of the present invention is to provide structures where the cords are inclined with respect to the mid-circumferential plane, which will eliminate the drawbacks of the structures referred to above while maintaining their advantages. The present invention may be employed in a wider field, giving to the tire further advantages in respect to road traction when the vehicle is running on a curve, together with an increased flexibility and an improved travelling comfort, and providing an easier construction obtained through a simplified technological process, as illustrated below.

In accordance with the present invention, it has been ascertained that the folding lines of the strips forming the belting structure possess a considerable longitudinal resistance, which may be compared with longitudinally disposed cords, and therefore, the employment of these latter cords may be replaced by a proper number of foldings. Moreover by distributing properly the number and the transverse positions of these foldings, the tire characteristics of resistance and flexibility may be graduated in each zone.

It has been discovered further that the longitudinal resistance provided by the folding lines allows the cords of the strips to be situated at angles greater than those which were attained previously, thereby improving the resistance to the transversal stresses without compromising the characteristics of tension resistance of the belting structure, which characteristics are indispensible for the proper working of the belting structure.

As stated above, the invention consists essentially in the construction of a belting structure characterized by the employment of strips superposed by folding, which results, therefore, in partially, or totally doubled strips. The cords of each strip, before the construction of the tire, are parallel to one another and have a diagonal direction with respect to the mid-circumferential plane of the tire so that, after the folding operation, the strip is composed of two superposed portions, the cords of one portion forming, with respect to the mid-circumferential plane, an angle which is symmetrical to that formed by the cords of the other portion. The angle formed by the cords of each portion and the mid-circumferential plane will range in value between 5° and 45°. Moreover, the doubled strips are disposed in such a way that their folding lines are nearer to the central portion than the free ends of the folds. The free ends are, therefore, adjacent to the tire sidewalls. The cords constituting the strips are made of a substantially inextensible material, such as natural, artificial, or synthetic textile material, or metallic material, and are dipped into natural and/or synthetic rubber compounds or plastic material. The number and the disposition of the strips forming the belting structure and the disposition of the folding lines are in accordance with the type and size of the tire and with the purpose for which it is designed. For convenience in the following description the term "layer" will indicate the assembly of two doubled strips which in their whole may be transversely disposed side-by-side or partially superposed.

The invention will now be further described with reference to the accompanying drawings which show, by way of non-limiting examples, some modifications of the invention itself. In these drawings:

FIGURE 1 illustrates a portion of a strip 1 not yet doubled, which consists of normal cords 2, all parallel to one another and disposed in such a direction as to form an angle α with respect to the side edge of the strip, or ultimately, with respect to the mid-circumferential plane of the tire, as designated by the line A—B in FIGURE 3.

Figure 2:
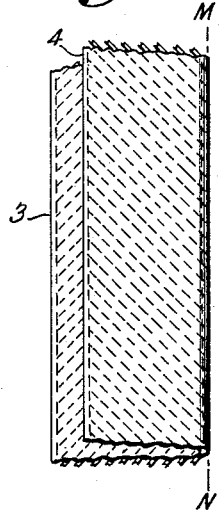
FIGURE 2 represents the ply shown in FIGURE 1, partially doubled.

In FIGURE 2 the same strip portion 1 has been folded along line M—N in such a way that the lower portion 3 is narrower than the upper portion 4. The doubling operation may however vary from a complete superposition to a disposition in which a non-doubled portion remains at the end of the free fold.

Figure 3:
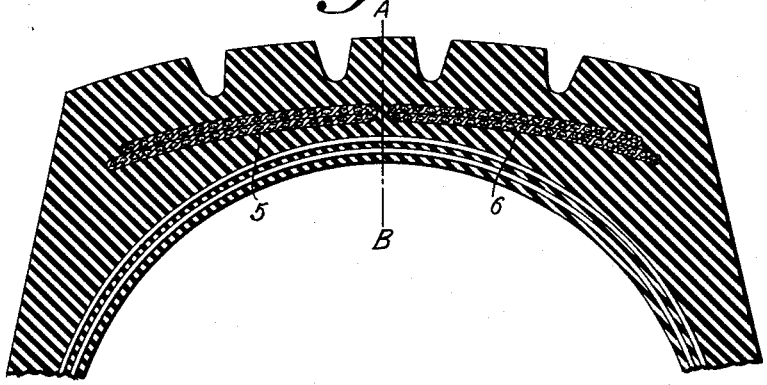
FIGURE 3 is a sectional view of a portion of a tire showing the relationship between the tread and one form of the belting structure of the present invention; the form shown here is made of a single layer consisting of two strips disposed side-by-side.

FIGURE 3 illustrates the simplest representation of a single-layer belting structure according to the invention, which is composed of two strips 5 and 6 almost completely doubled and whose folding lines lie along the central portion of the tire. This embodiment, although it includes some of the advantages provided by the invention, does not eliminate the disadvantage of transverse discontinuity in the central portion. This disadvantage may, however, be obviated by employing suitable reinforcements covering the gaps between the two strips; these reinforcements are disposed over and/or below the two doubled strips, and consist of strips folded at the ends in a more or less wide degree, or of one or more single strips.

Figure 4:
FIGURE 4 is a diagrammatic section of a modification of the belting structure, derived from the inventive principle illustrated in FIGURE 3, which is formed of a single layer provided with a reinforcement in its central portion.

FIGURE 4 represents a modification of FIGURE 3 in which the central reinforcement consists of a strip 7 folded at its ends.

Figure 5:
FIGURE 5 is a diagrammatic section of a further modification of the belting structure in accordance with the invention, formed of a layer the two strips of which overlap in the central portion.

The transverse discontinuity may also be eliminated by overlapping two strips 8 and 9 in the central portion of the tire as shown in FIGURE 5. The reinforcement or superposition, as it may be seen in FIGURES 4 and 5, respectively, may have any width, which is preferably not less than ¼ of the width of the belting structure.

Figure 6:
FIGURE 6 is a diagrammatic section of a modification of the belting structure, derived from the inventive principle illustrated in FIGURE 3, which is formed of two layers in each of which the strips are disposed side-by-side.

The belting structure may be composed of several layers. Therefore, FIGURE 6 represents a structure composed of two layers in each of which the strips 10 and 11 and 10′ and 11′, respectively, are disposed side-by-side. In this case the two folding lines of one layer are disposed in staggered relationship with respect to those of the other layer. This disposition prevents the whole structure from being transversely interrupted and obtains a transverse distribution of the folding lines with a consequent transverse graduation of the flexibility and longitudinal resistance.

Figure 7:
FIGURE 7 is a diagrammatic section of a modification derived from FIGURE 5, in which the belting structure includes two additional superposed layers which overlap in the central portion.

FIGURE 7 represents another two-layer structure, based upon the single layer embodiment of FIGURE 5, in which the strips of each layer 8 and 9 and 8′ and 9′, respectively, are overlapped in the central portion. Also, in this case, the degree of superposition may be different in the various layers in order to graduate transversely the flexibility of the belting structure and to distribute the folding lines so as to graduate their longitudinal resistance.

It should be obvious that there can be two or more layers, and that the layers in which the strips are disposed side-by-side can be combined with those in which the strips are superposed or overlapped.

All of the belting structures formed according to the present invention show typical portions or points, as for instance the transversal interruption of the outer layers in the case of strips disposed side-by-side or the thickening of the mid-circumferential zone in the case of superposed strips. If the consequences of these points or portions were to be eliminated, conventional breaker strips could be usefully disposed over and/or below the belting structure.

The expression "conventional breaker" means the sheer plies of cords, made of natural, artificial or synthetic textile material, parallel to one another and forming with respect to the mid-circumferential plane angles ranging between 40° and 45°. As it is known, the conventional breaker has a double action, namely that of distributing the concentrated stresses and of ensuring a better bonding of the parts between which it is situated by means of suitable compounds in which the cords are embedded.

Figure 8:
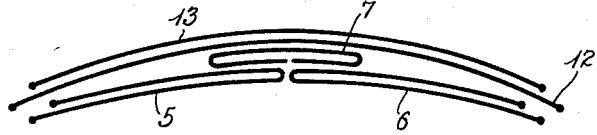
FIGURE 8 represents an alternative form of FIGURE 4 in which two conventional breaker strips are disposed on the belting structure.

FIGURE 8 represents a modification of FIGURE 4 wherein two strips 12 and 13 of conventional breaker are both situated over the belting structure.

Figure 9:
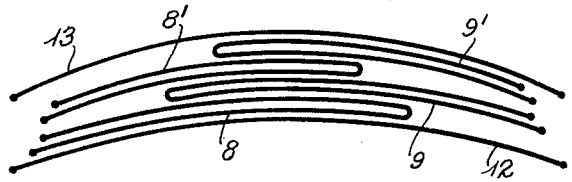
FIGURE 9 represents an alternative form of FIGURE 7 in which a conventional breaker strip is disposed above and below the belting structure.

FIGURE 9 represents a modification of FIGURE 7 wherein one strip of conventional breaker 12 is situated below the belting structure and another strip 13 of conventional breaker is situated over it.

The strips of conventional breaker may be more than two; however they will be used in even number, one half of which being disposed in such a way that their cords form a certain angle with respect to the mid-circumferential plane and the other half being disposed with the cords in a direction symmetrical to the first half with respect to said plane.

Figure 1:
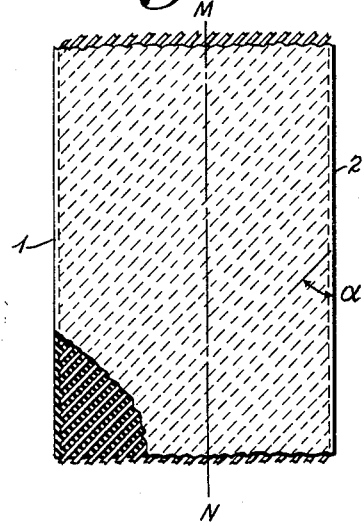
FIGURE 1 is a plan view of a portion of an unfolded ply employed in forming the belting structure of the present invention.

In all the above described embodiments and in all of their variations, strips and reinforcements in which the cords are all disposed at a certain angle in the original elementary fabric (see FIGURE 1) will be used in the construction of the belting structure so that in this structure all the cords will be situated along two directions symmetrical with respect to the mid-circumferential plane.

The belting structures embodying the principles of the present invention impart to the tire and to its construction some improvements and advantages, the main features of which are the following:

(*a*) a good resistance to longitudinal tension, even without the presence of parallel or nearly parallel cords at the mid-circumference of the tire;

(*b*) any desired graduation of the total longitudinal rigidity by varying the number of the folding lines;

(*c*) any desired graduation of the distribution of the rigidity according to the concentration of the folding lines and/or of the superposition of the plies of the belting structure from the center towards the sides of the structure itself. (In this case the construction of a tire provided with a rigidity which decreases gradually from the equatorial line towards the sidewalls is rendered easier, and the belting structure is consequently given improved characteristics, in particular to the travelling comfort and the reduced wear of the tread.)

(d) the absence of lines of discontinuity in the whole structure and a consequent increase in the coefficient of safety of the carcass cords with respect to the transversal stresses due to the inflation pressure. With the same coefficient of safety, the above mentioned structures allow a saving in the material constituting the cords of the carcass plies;

(e) the simplification of the various operations of construction, in particular in the case of the structures in which the doubled plies of the belting are superposed; in fact, by varying suitably the degree of superposition of the strips, the same fabric may be used for making tires of different size without changing the composition and the thickness of the cords which constitute it;

(f) the increase of the number of constructional combinations and modifications for any type of tire.

As the graduation of the longitudinal resistance may be obtained by varying the number of the folding lines or the transversal width of superposition, in case a single type of fabric is available for the construction of belting structures adapted for tires of different sizes, a consequent overall savings in the material employed for these different structures is obtained.

It is understood that the invention is not confined to the above embodiments but includes all of their modifications or combinations derived from the above described inventive principle.

What is claimed is:

1. In a pneumatic tire of the type provided with a belting structure for withstanding the tension stresses when placed under tension by the inner inflation pressure of the tire, the improvement wherein said belting structure comprises at least one layer consisting of two strips, each strip being doubled by folding along folding lines which are parallel to the mid-circumferential plane of the tire, the folded portions of each strip being mutually superposed for at least part of the width of said strip in cross-section of the tire and terminating in free ends, the folding line of each strip being nearer to the mid-circumferential plane of the tire than its free ends, the free ends of one strip of said one layer being adjacent to one of the tire sidewalls and the free ends of the other strip of said one layer being adjacent the other of the tire sidewalls, each strip being made of cords parallel to one another, the cords of the strips being disposed along two directions symmetrical with respect to the mid-circumferential plane, each of said directions forming with said plane an angle ranging from 5° to 45°.

2. A pneumatic tire as set forth in claim 1 in which the folding lines of the two strips forming each layer are in abutting relation.

3. A pneumatic tire as set forth in claim 2 in which a reinforcing strip is disposed above the belting structure.

4. A pneumatic tire as set forth in claim 2 in which a reinforcing strip is disposed below the belting structure.

5. A pneumatic tire as set forth in claim 2 in which reinforcing strips are disposed above and below the belting structure.

6. A pneumatic tire as set forth in claim 2 in which said belting structure is formed of more than one layer, the folding lines of the strips of each layer being disposed in staggered relationship with respect to the folding lines of the adjacent layer.

7. A pneumatic tire as set forth in claim 2 in which an even number of plies of sheer parallel cords disposed at an angle of about 45° with respect to said mid-circumferential plane are placed above said belting structure.

8. A pneumatic tire as set forth in claim 2 in which an even number of plies of sheer parallel cords disposed at an angle of about 45° with respect to said mid-circumferential plane are placed below said belting structure.

9. A pneumatic tire as set forth in claim 2 in which an even number of plies of sheer parallel cords disposed at an angle of about 45° with respect to said mid-circumferential plane are placed above and below said belting structure.

10. A pneumatic tire as set forth in claim 1 in which the two strips forming each layer are superposed in the mid-circumferential zone, the width of superposition being not less than ¼ of the witdh of the structure itself.

11. A pneumatic tire as set forth in claim 10 in which said belting structure is formed of more than one layer, the width of superposition being different in the various layers.

12. A pneumatic tire as set forth in claim 10 in which an even number of plies of sheer parallel cords disposed at an angle of about 45° with respect to said mid-circumferential plane are placed above said belting structure.

13. A pneumatic tire as set forth in claim 10 in which an even number of plies of sheer parallel cords disposed at an angle of about 45° with respect to said mid-circumferential plane are placed below said belting structure.

14. A pneumatic tire as set forth in claim 10 in which an even number of plies of sheer parallel cords disposed at an angle of about 45° with respect to said mid-circumferential plane are placed above and below said belting structure.

References Cited in the file of this patent

FOREIGN PATENTS

| | | |
|---|---|---|
| 700,435 | Great Britain | Dec. 2, 1953 |
| 549,017 | Italy | Oct. 4, 1956 |